(12) United States Patent  
Boutaghou et al.

(10) Patent No.: US 6,327,241 B1  
(45) Date of Patent: Dec. 4, 2001

(54) OPTICAL DATA STORAGE SYSTEM WITH LENS MOUNT

(75) Inventors: Zine-Eddine Boutaghou, Vadnais Heights; Mary C. Hipwell, Minneapolis; Edward C. Gage, Apple Valley; Nicholas Jordache, Eden Prairie, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/489,956

(22) Filed: Jan. 24, 2000

Related U.S. Application Data

(63) Continuation-in-part of application No. 09/118,548, filed on Jul. 17, 1998, now abandoned, which is a continuation-in-part of application No. 08/895,257, filed on Jul. 15, 1997, now Pat. No. 5,828,644.
(60) Provisional application No. 60/063,618, filed on Oct. 27, 1997, and provisional application No. 60/042,831, filed on Apr. 8, 1997.

(51) Int. Cl.⁷ .................................. G11B 7/08; G11B 7/22
(52) U.S. Cl. ............................................................. 369/300
(58) Field of Search .................................. 369/103, 112, 369/99, 110, 300

(56) References Cited

U.S. PATENT DOCUMENTS

| | | | |
|---|---|---|---|
| 3,980,811 | 9/1976 | Schaefer et al. | 178/6.6 |
| 4,229,067 | 10/1980 | Love | 350/96.15 |
| 4,310,916 | 1/1982 | Dil | 369/109 |
| 4,443,700 | 4/1984 | Macedo et al. | 250/227 |
| 4,569,038 | 2/1986 | Nagashima et al. | 369/44 |
| 4,581,529 | 4/1986 | Gordon | 250/227 |
| 4,706,235 | 11/1987 | Melbye | 369/46 |
| 4,769,800 | 9/1988 | Moser et al. | 369/32 |
| 4,799,210 * | 1/1989 | Wilson et al. | 369/110 |
| 4,815,064 | 3/1989 | Melbye | 369/59 |
| 4,933,537 | 6/1990 | Takahashi et al. | 235/454 |
| 4,994,658 | 2/1991 | Takehashi et al. | 235/473 |
| 5,004,307 | 4/1991 | Kino et al. | 350/1.2 |
| 5,096,277 | 3/1992 | Kleinerman | 385/12 |
| 5,124,961 * | 6/1992 | Yamaguchi et al. | 369/13 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,212,379 | 5/1993 | Nafarrate et al. | 250/227.14 |
| 5,255,260 * | 10/1993 | Yamada et al. | 369/199 |
| 5,278,812 | 1/1994 | Adar et al. | 369/44.12 |
| 5,286,971 | 2/1994 | Betzig et al. | 250/227.26 |
| 5,351,229 * | 9/1994 | Brezoczky et al. | 369/99 |
| 5,363,463 | 11/1994 | Kleinerman | 385/123 |
| 5,450,203 | 9/1995 | Penkethman | 356/373 |
| 5,493,393 | 2/1996 | Beranek et al. | 356/328 |
| 5,497,359 * | 3/1996 | Mamin et al. | 369/44.15 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |
| 5,729,393 * | 3/1998 | Lee et al. | 359/819 |
| 5,774,281 * | 6/1998 | Maeda et al. | 359/822 |

(List continued on next page.)

*Primary Examiner*—David L. Ometz
*Assistant Examiner*—Angel Castro
(74) *Attorney, Agent, or Firm*—Westman, Champlin & Kelly, P.A.

(57) ABSTRACT

An optical data storage system including an optical disc with a data surface. A transducing mechanism includes an objective lens. A slider is positioned adjacent the data surface of the optical disc. An adjustable lens mount couples the objective lens to the slider. The lens mount is adjusted to focus light through the objective lens onto the data surface and the adjustable mount is fixed in this position.

16 Claims, 2 Drawing Sheets

U.S. PATENT DOCUMENTS

| | | | |
|---|---|---|---|
| 5,818,592 | * 10/1998 | Womack et al. | 356/357 |
| 5,828,644 | * 10/1998 | Gage et al. | 369/112 |
| 5,881,042 | * 3/1999 | Knight | 369/99 |
| 5,917,788 | * 6/1999 | Mowry | 369/44.23 |
| 5,936,928 | * 8/1999 | Jain et al. | 369/99 |
| 5,946,282 | * 8/1999 | Hirono et al. | 369/112 |
| 6,134,195 | * 10/2000 | Kawamura | 369/44.23 |
| 6,151,174 | * 11/2000 | Hendriks | 359/821 |

* cited by examiner

OPTICAL DATA STORAGE SYSTEM WITH LENS MOUNT

This Appl is a CIP of 09/118,548, filed Jun. 17, 1998, now abandoned which claims benefit of Provisional 60/063,618, filed Oct. 27, 1997 and a CIP of Ser. No. 08/895,257, filed Jul. 15, 1997, now U.S. Pat. No. 5,828,644, which claims benefit of Provisional 60/042,831, filed Apr. 8, 1997.

BACKGROUND OF THE INVENTION

The present invention is a Continuation-in-Part application of U.S. Ser. No. 09/118,548, filed Jul. 17, 1998, now abandoned and entitled "Optical Data Storage System with Lens Mount", abandoned, which is a Continuation-in-Part of application U.S. Ser. No. 08/895,257 filed Jul. 15, 1997, now U.S. Pat. No. 5,828,644.

The present invention relates to optical data storage systems. More specifically, the present invention relates to optical data storage systems which include an objective lens coupled to a slider.

Optical data storage disc systems are a promising technology for storing large quantities of data. The data is accessed by focusing a laser beam onto a data surface of the disc and analyzing light reflected from or transmitted through the data surface.

In general, in optical storage systems, data is in the form of marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

The above systems require a beam of light to be focused onto a data surface of a disc and recovering the reflected light. Storage density is determined not only be the size of the markings on the data surface, but also by the size of the beam focused on the surface (i.e. resolution). One type of optical element which can be used in conjunction with an objective lens to reduce the ultimate spot size of the light beam is a Solid Immersion Lens or SIL. A SIL reduces the beam spot size by virtue of the wavelength reduction which occurs when light is inside an optically dense medium. The SIL is positioned very close to the data surface of the disc and couples light to the disc surface via evanescent wave effects. This is often referred to as the "near-field" regime. The use of SILs for data storage is described in U.S. Pat. No. 5,125,750 to Corle et al. which issued Jun. 30, 1992 and in U.S. Pat. No. 5,497,359 to Mamin et al. which issued Mar. 5, 1996. In these optical systems, a laser beam is focused onto the SIL using an objective lens. The SIL is preferably carried on a slider and the slider is positioned close to the disc data surface.

One difficulty encountered in the prior art is correctly focussing light from an optical source onto the data surface of the storage medium. For example, if an objective lens is used which is coupled to a slider, the lens is attached to the slider using an adhesive having a thickness which can be 20 times thicker than the tolerance of the system.

SUMMARY OF THE INVENTION

The present invention includes an optical data storage system having an optical disc with a data surface. A transducing mechanism includes an objective lens. A slider is positioned adjacent the data surface of the optical disc. An adjustable lens mount couples the objective lens to the slider. The lens mount is adjusted to focus light through the objective lens onto the data surface and the adjustable mount is fixed in this position. In one aspect of the invention the adjustable lens mount includes a lower lens mount coupled to the slider and an upper lens mount coupled to the objective lens. Another aspect of the invention includes laser welding the adjustable lens mount in place.

In a method of the present invention steps include obtaining an optical storage medium having a recording surface; obtaining a slider designed to move adjacent the data surface of the optical storage medium; obtaining a transducing element which includes an objective lens; mounting the lens in an adjustable mount and coupling the mount to the slider; and adjusting spacing between the objective lens and the data surface using the adjustable mount. One aspect of the method includes fixing the adjustable mount following the step of adjusting the spacing.

DETAILED DESCRIPTION OF THE PREFERRED EMBODIMENTS

The present invention provides an adjustable mount for use with a slider of an optical data storage system. The adjustable mount couples to an objective lens of the system and is used for selectively adjusting the spacing between the objective lens and the slider and/or a data surface of an optical storage medium. When the adjustable mount is properly adjusted such that light through the objective lens is focussed on the data surface, the adjustable mount is fixed in place. In one preferred embodiment, the adjustable mount is fixed in place by welding, preferably laser welding, the mount. For example, in one aspect of the invention, the adjustable mount includes a lower lens mount coupled to the slider and an upper lens mount coupled to the objective lens. The upper and lower lens mounts are slidably received together such that when proper spacing has been achieved, the upper and lower lens mounts can be welded together. The invention is particularly advantageous over prior art techniques, such as an adhesive, which can be up to 20 times thicker than the tolerance required to properly focus the objective lens. Further, such prior art techniques often have coefficients of thermal expansion whereby operation of the data storage system can cause heating of the lens mount to thereby cause the lens to lose focus. In contrast, the adjustable mount of the invention achieves low thermal expansion, particularly when two separate mounts are coupled to the lens and slider, respectively. Further, proper focus is more easily achieved than in prior art systems and the adjustable mount is easily fixed in place once properly adjusted.

Figure 1:
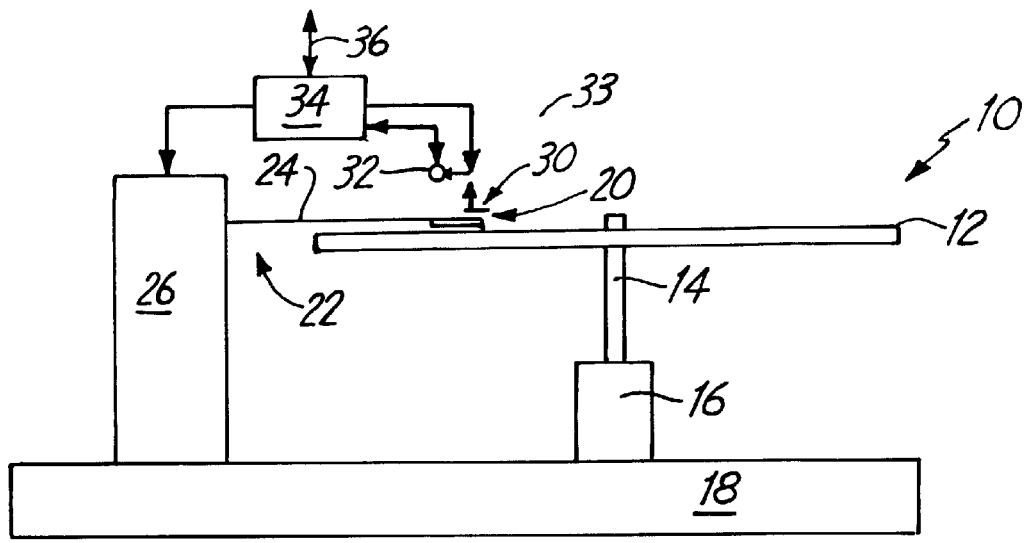
FIG. 1 is a simplified diagram showing an optical storage system using a lens mount in accordance with one embodiment of the present invention.

FIG. 1 is a simplified illustration of an optical recording system 10 employing a Solid Immersion Lens (SIL) and lens mount in accordance with the present invention. System 10 includes optical disc 12 having a data surface which carries optically encoded information. Disc 12 rotates about spindle 14 and is driven by a spindle motor 16 mounted on base 18. A slider 20 is positioned proximate disc 12 and is coupled to an actuator 22 which includes armature 24 and actuator motor 26 which couples to base 18. Slider 20 includes optical elements 30 in accordance with the present invention. An optical source/sensor apparatus 32 is optically coupled to elements 30 through mirror 33. A controller 34 couples to apparatus 32, mirror 33, actuator 26 and data bus 36 and is used for controlling operation of system 10.

During operation; disc 12 rotates and slider 20 is positioned radially over the data surface of disc 12 using actuator 22. Controller 34 controls the position of slider 20, whereby information may be read from (and in some embodiments written to) the data surface of disc 12 using optical source/sensor apparatus 32 and optical elements 30. Precise control of spot position is achieved by controller 34 scanning the spot across the disc surface over several tracks. For example, this could be by moving mirror 33. The precise configuration of apparatus of 32 may be selected based upon the type of storage system 10 employed. In general, source/sensor apparatus 32 includes an optical source which directs light toward optical elements 30 for illuminating the data surface of disc 12. Light is reflected back through optical elements 30 from the data surface of disc 12 for detection by apparatus 32. Controller 34 senses the reflected signal which is converted to data for transmission on data bus 36.

Figure 2:
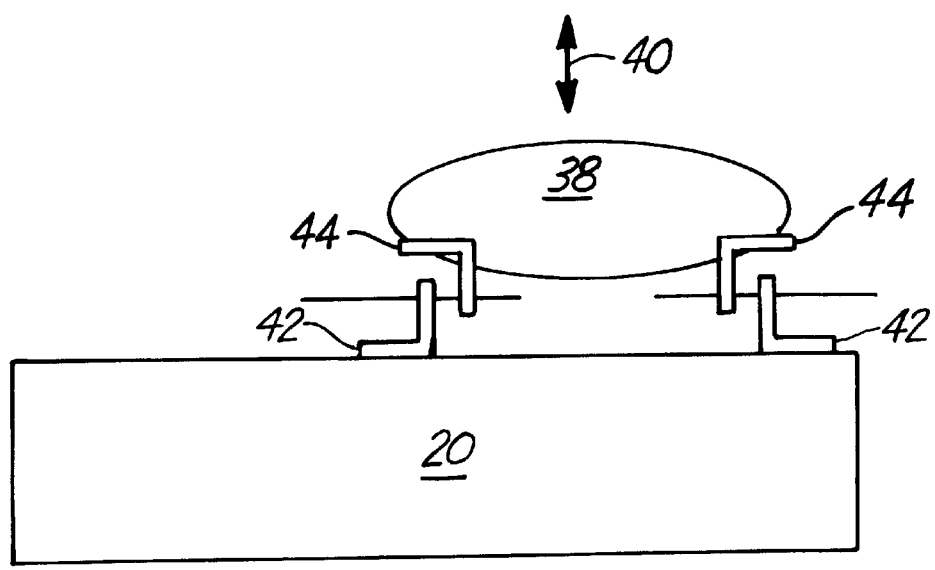
FIG. 2 is an elevation view showing a lens positioned on an optical slider using a lens mount in accordance with the present invention.

FIG. 2 is an elevation view of a portion of an optical head employing a lens mount in accordance with the present invention. As is known, in order to properly configure an optical head, the optical lenses must be focussed precisely. Thus, in FIG. 2 it is necessary to precisely configure objective lens 38 vertically with respect to slider 20 as indicated by arrow 40. As can be seen in FIG. 2, a lower lens mount 42 is coupled directly to slider 20 and is adapted to slidably receive upper lens mount 44. Upper lens mount 44 is coupled to objective lens 38 such that the sliding provided by cooperation between lower lens mount 42 and upper lens mount 44 displaces objective lens 38 in the direction of arrow 40 with respect to slider 20. For clarity, relatively large gaps are shown between lower lens mount 42 and upper lens mount 44 however, in reality, such gaps would not be visible because the lens mounts preferably slide directly adjacent to one another. It is preferred that lower lens mount 42 and upper lens mount 44 are ring-shaped such that upper lens mount 44 attaches to the contour of circular objective lens 38. However, the ring shape of lens mounts 42 and 44 is not necessary to practice the present invention, and in fact other appropriate shapes may be used.

After objective lens 38 has been properly positioned, such that light entering objective lens 38 is properly focussed, lower lens mount 42 and upper lens mount 44 are permanently affixed together. Preferably, the fixation of lower lens mount 42 to upper lens mount 44 is achieved by directing a relatively large amount of energy, preferably using a laser, through a portion of lower lens mount 42 and upper lens mount 44 such that those portions fuse together. Thus, no adhesive whatsoever is required to fix the lens mounts together.

Figure 3:
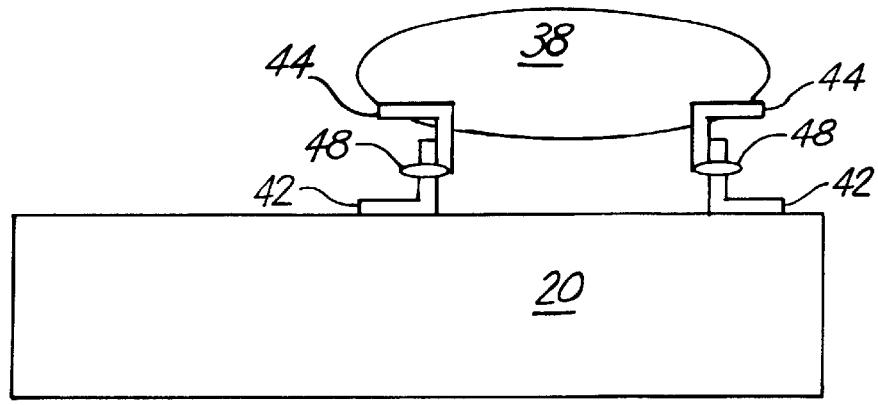
FIG. 3 is an elevation view of a lens mounted to an optical slider in accordance with the present invention.

FIG. 3 is an elevation view of a fused lens mount in accordance with the present invention. As shown in FIG. 3, lower lens mount 42 is fused to upper lens mount 44 by welds 48. It is preferred that lower lens mount 42, upper lens mount 44, and welds 48 are formed of the same material. More preferably, lower lens mount 42, upper lens mount 44 and welds 48 are preferably formed from materials which have a low thermal expansion, such as molybdenum, tantalum, tungsten, or zirconium. The physical dimensions of the objective lens, the index of refraction of the objective lens, the laser wavelength, the properties of the incident beam, and the mechanical supports of the other mechanical components in the system will change as a function of temperature. The use of a two-piece lens mount described in this invention disclosure provides the degrees of freedom to compensate this temperature induced defocus so that the system performance is independent of temperature. The two-piece mount may be designed of a low thermal expansion material if the thermal effects are small (compensated) from the other elements or it may be designed to have a specific thermal expansion to cancel the other components. One aspect of this invention is the ability to use two dissimilar materials in the mount to provide a very specific thermal behavior, contraction or expansion. As such, changes in temperature will have a lesser effect on the position of the focus of the objective lens 38 than would be the case with lens mounts constructed from materials having unmatched coefficients of thermal expansion.

Figure 4:
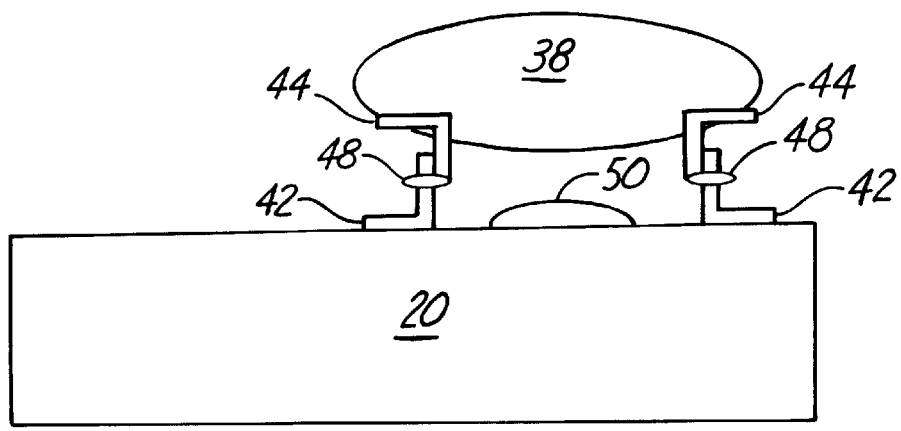
FIG. 4 is an elevation view showing an optical storage head incorporating a SIL and a lens mount in accordance with the present invention.

FIG. 4 is an elevation view of the lens mounts of the present invention separating objective lens 38 from SIL 50. SIL 50 is disposed on a top surface of slider 20. In this embodiment, objective lens 38 is spaced from SIL 50 by the cooperation of lower lens mount 42 and upper lens mount 44 such that light passing through objective lens 38 is focussed upon SIL 50. Although it is possible to fabricate a SIL within slider 20 (such embodiment would appear as in FIGS. 2 and 3) providing a separate SIL 50 disposed on slider 20 may enhance manufacturabilty of the optical head. Thus, it is believed that the present invention is applicable not only to the focussing of light on an optical head, but more generally to high precision (such as 0.5 micron) adjustments of optical lenses.

Although the present invention has been described with reference to preferred embodiments workers skilled in the art will recognize that changes may be made in form and detail without departing from the spirit and scope of the invention.

What is claimed is:

1. An optical data storage system, comprising:
   an optical disc having a data surface;
   a transducing mechanism including an objective lens;
   a slider positioned adjacent the data surface;
   a lower lens mount coupled to the slider, the lower lens mount having an interior wall;
   an upper lens amount coupled to the objective lens and having an exterior wall configured to slidably engage the interior wall of the lower lens mount through a rangeof axial positions, the upper lens mount moveable in the axial direction relative to the lower lens mount; and
   a bond fixedly coupling the upper lens mount to the lower lens mount, the upper lens mount bonded to the lower lens mount at a position to focus light through the objective lens onto the data surface.

2. The optical data storage system of claim 1 wherein the lower lens mount is ring-shaped.

3. The optical data storage system of claim 1 wherein the upper lens mount is ring-shaped.

4. The optical data storage system of claim 1 wherein the upper and lower lens mounts slidably fit together.

5. The optical data storage system of claim 1 wherein the bond comprises a weld.

6. The optical data storage system of claim 5 wherein the weld comprises a laser weld.

7. The optical data storage system of claim 1 wherein the lower lens mount is bonded to the slider.

8. The optical data storage system of claim 1 wherein the upper lens mount is bonded to the lens.

9. The optical data storage system of claim 1 including a lower lens coupled to the slider and the objective lens is focussed on the lower lens.

10. The optical data storage system of claim 9 wherein the lower lens comprises a Solid Immersion Lens (SIL).

11. A method of manufacturing an optical storage system, comprising:

obtaining an optical storage medium having a data surface;

obtaining a slider designed to move adjacent the data surface;

obtaining a transducing element which includes an objective lens;

mounting the objective lens in an adjustable mount and coupling the adjustable mount to the slider by coupling a lower lens mount to the slider and an upper lens mount to the objective lens;

adjusting spacing between the objective lens and the data surface using the adjustable mount to focus the objective lens; and fixedly attaching the upper lens mount to the lower lens mount following the step of adjusting.

12. The method of claim 11 wherein the upper and lower lens mounts are slidably received together.

13. The method of claim 11 wherein the step of fixing comprising welding.

14. The method of claim 13 wherein the step of welding comprises laser welding.

15. The method of claim 11 including placing a second lens between the objective lens and the data surface.

16. The method of claim 15 wherein the second lens comprises a Solid Immersion Lens (SIL).

\* \* \* \* \*